US008472036B2

(12) United States Patent
Sakuraba (10) Patent No.: US 8,472,036 B2
(45) Date of Patent: Jun. 25, 2013

(54) CONTROLLING PROGRAM AND CONTROLLING METHOD

(75) Inventor: Tamotsu Sakuraba, Sagamihara (JP)

(73) Assignee: Konica Minolta Business Technologies, Inc., Chiyoda-ku, Tokyo (JP)

( * ) Notice: Subject to any disclaimer, the term of this patent is extended or adjusted under 35 U.S.C. 154(b) by 1099 days.

(21) Appl. No.: 12/126,348

(22) Filed: May 23, 2008

(65) Prior Publication Data

US 2009/0135441 A1   May 28, 2009

(30) Foreign Application Priority Data

Nov. 22, 2007   (JP) ................. 2007-302827

(51) Int. Cl.
*G06F 3/12*   (2006.01)

(52) U.S. Cl.
USPC ......................... 358/1.13; 358/1.1

(58) Field of Classification Search
USPC ................... 358/1.1, 1.9, 1.13, 1.15
See application file for complete search history.

(56) References Cited

U.S. PATENT DOCUMENTS

| 7,057,747 | B1 * | 6/2006 | Minagawa | 358/1.13 |
| 2007/0103726 | A1 * | 5/2007 | Iwata et al. | 358/1.15 |
| 2010/0174725 | A1 * | 7/2010 | Adams et al. | 707/749 |

FOREIGN PATENT DOCUMENTS

JP   2001-290625 A   10/2001

* cited by examiner

*Primary Examiner* — King Poon
*Assistant Examiner* — Iriana Cruz
(74) *Attorney, Agent, or Firm* — Buchanan Ingersoll & Rooney PC (57) ABSTRACT

There is described a controlling method to be employed in a printing system that includes: a plurality of image forming apparatuses, each of which is capable of assigning a name to setting information in regard to a printing operation and also capable of registering the setting information in association with the name thereof; and a specific apparatus to be coupled to the plurality of image forming apparatuses. The method includes: acquiring plural sets of setting information, each of which is the setting information registered in each of the plurality of image forming apparatuses in association with the name thereof; determining whether or not at least two of the names assigned to the plural sets of setting information are cognominal; and displaying a message, indicating a fact that the same name is assigned to at least two of the plural sets of the setting information, when the names are cognominal.

13 Claims, 9 Drawing Sheets

FIG. 3 (a) 40: PAPER-SHEET INFORMATION REGISTERING SCREEN

REGISTERING PAPER-SHEET INFORMATION

| | NAME OF PAPER SHEET | BASIS WEIGHT | KIND OF PAPER | COLOR OF PAPER | PUNCHING |
|---|---|---|---|---|---|
| 001 | ABCDE | 80 g/m² | NORMAL PAPER | WHITE | DEACTIVATE |
| 002 | FGHIJ | 200 g/m² | THICK PAPER | BLUE | ACTIVATE |
| 003 | KLMNO | 50 g/m² | THIN PAPER | WHITE | DEACTIVATE |
| 004 | | | | | |

[CANCEL] [OK]

FIG. 3 (b) 41: PAPER-SHEET DETAIL INFORMATION SETTING SCREEN

SETTING PAPER-SHEET DETAIL INFORMATION

004
| NAME OF PAPER SHEET | FGHIJ |
| BASIS WEIGHT | 80 g/m² |
| KIND OF PAPER | NORMAL PAPER |
| COLOR OF PAPER | YELLOW |
| PUNCHING | DEACTIVATE |

KIND OF PAPER
- NORMAL PAPER
- THIN PAPER
- ENAMEL PAPER
- OHP
- ADDITIONAL PRINT PAPER
- WOODFREE PAPER
- THICK PAPER

[CANCEL] [OK]

FIG. 3 (c) 40: PAPER-SHEET INFORMATION REGISTERING SCREEN

REGISTERING PAPER-SHEET INFORMATION

| | NAME OF PAPER SHEET | BASIS WEIGHT | KIND OF PAPER | COLOR OF PAPER | PUNCHING |
|---|---|---|---|---|---|
| 001 | ABCDE | 80 g/m² | NORMAL PAPER | WHITE | DEACTIVATE |
| 002 | FGHIJ | 200 g/m² | THICK PAPER | BLUE | ACTIVATE |
| 003 | KLMNO | 50 g/m² | THIN PAPER | WHITE | DEACTIVATE |
| 004 | FGHIJ | 80 g/m² | NORMAL PAPER | YELLOW | DEACTIVATE |

[CANCEL] [OK]

FIG. 4

| No. | NAME OF PAPER SHEET | BASIS WEIGHT | KIND OF PAPER | COLOR OF PAPER | PUNCHING | PRINTER |
|---|---|---|---|---|---|---|
| 1 | ABCDE | 80 g/m² | NORMAL PAPER | WHITE | DEACTIVATE | A |
| 2 | FGHIJ | 200 g/m² | THICK PAPER | BLUE | ACTIVATE | A |
| 3 | KLMNO | 50 g/m² | THIN PAPER | WHITE | DEACTIVATE | A |
| 4 | FGHIJ | 80 g/m² | NORMAL PAPER | YELLOW | DEACTIVATE | B |

FIG. 5

50: PRINT SETTING SCREEN

51: PAPER SHEET INFORMATION CONFIRMING SCREEN

| PAPER SHEET INFORMATION | | | | | | |
|---|---|---|---|---|---|---|
| No. | NAME OF PAPER SHEET | BASIS WEIGHT | KIND OF PAPER | COLOR OF PAPER | PUNCHING | PRINTER |
| 1 | ABCDE | 80 g/m² | NORMAL PAPER | WHITE | DEACTIVATE | A |
| 2 | FGHIJ | 200 g/m² | THICK PAPER | BLUE | ACTIVATE | A |
| 3 | KLMNO | 50 g/m² | THIN PAPER | WHITE | DEACTIVATE | A |
| 4 | FGHIJ | 80 g/m² | NORMAL PAPER | YELLOW | DEACTIVATE | B |

52: WARNING MESSAGE SCREEN

WARNING

⚠ NAMES OF PLURAL SETS OF SETTING INFORMATION ARE COGNOMINAL

CONTROLLING PROGRAM AND CONTROLLING METHOD

This application is based on Japanese Patent Application No. 2007-302827 filed on Nov. 22, 2007, with Japan Patent Office, the entire content of which is hereby incorporated by reference.

BACKGROUND OF THE INVENTION

The present invention relates to a controlling program and a controlling method, and specifically relates to such a controlling program that is to be executed in an image forming apparatus or an apparatus coupled to the image forming apparatus concerned, and to such a controlling method that is to be employed in an image forming apparatus or a control apparatus.

In recent years, there have been increasingly proliferated in the market various kinds of image forming apparatuses, such as a copier provided with a copy function, a facsimile apparatus provided with a facsimile function, a printer provided with a printer function, a multi-functional apparatus provided with a scanner function in addition to the abovementioned functions (hereinafter, referred to as an image forming apparatus as a general term for each of them). When the image forming apparatus is employed as the network printer to implement the printing operation, at first, the image forming apparatus concerned receives print data represented in the format of the Page Description Language (hereinafter, also referred to as the PDL, for simplicity) sent from client terminal device coupled to the network, and then, rasterizes the received print data (namely, develops the print data into the bitmap) so as to create the multi-value image data (for instance, 8-bit image data), and further, applies the screening (binarizing) operation to the multi-value image data so as to create the binary image data, and finally, applies image adjusting operations to the binary image data as needed, in order to output an image based on the adjusted binary image data onto the paper sheet.

However, when plural image forming apparatuses are coupled to each other through the network, in order to implement such the processing for creating the multi-value image data from the print data (hereinafter, referred to as a RIP (Raster Image Processor) processing) and/or the screening processing of the multi-value image data within each of the plural image forming apparatuses, the functional capability for implementing the abovementioned processing should be provided in each of the plural image forming apparatuses. This forcibly complicates the configuration of each of the image forming apparatuses. Accordingly, in such a system as abovementioned, there has been employed such a system configuration that the printer controller provided with functions of the RIP processing and the screening processing is coupled to the network, so that the printer controller concerned implements the abovementioned processing by proxy of each of the plural image forming apparatuses.

In this connection, since the documents to be created by the client terminal device vary over a wide range, sometimes, a kind of paper sheet to be employed and/or the settings for finish processing would be changed corresponding to the use of the document. For instance, when creating a regular material, a normal paper sheet is usually employed for printing, and the printed paper sheet is outputted as it is, while, when creating an important material, sometimes, a thick and colored paper sheet is employed for printing, and a finish processing, such as a punching operation, etc., is applied to the printed paper sheet before outputting it. On that occasion, since it is cumbersome for the user to set a kind of paper sheet, a method of finish processing, etc. for every time when implementing a printing operation, the image forming apparatus, developed in recent years, is so constituted that it is possible to give a name to setting information, including a kind of paper sheet, a finish processing, etc., in regard to a certain printing operation and to register the name of the setting information in advance, so that the printing operation according to the setting information designated by the user can be automatically implemented, only by designating the name of the setting information.

With respect to the abovementioned registering function of the setting information, for instance, Tokkai 2001-290625 (Japanese Non-Examined Patent Publication) sets forth such a configuration that, in the dispersion print controlling apparatus in which a printing operation is conducted by dispersing the print data concerned among a plurality of printers, the apparatus comprises: a display device to display a data inputting screen for setting predetermined conditions in regard to a printing ability provided for each of printers; a condition setting section to acquire the data inputted from the data inputting screen so as to establish the predetermined conditions based on the inputted data; a printer ability information acquiring section to acquire ability information in regard to the predetermined conditions provided in each of the plurality of printers; and a data input limiting section to limit an input allowable range of the data to be inputted from the data inputting screen to such a range that corresponds to the ability information of each printer, acquired by the printer ability information acquiring section.

As described in the above, according to the abovementioned configuration, since the setting information is registered in advance in the image forming apparatus concerned, it is possible for the client terminal device or the printer controller to acquire the setting information registered in advance. Accordingly, only by selecting the name of the setting information concerned on the screen displayed by the printer driver of the client terminal device or the application program of the printer controller, the user can designate the printing conditions as the desired conditions.

However, in such the dispersion outputting mode that makes a single printer driver or a single application program control a plurality of image forming apparatuses, since the setting information can be individually registered by each of the image forming apparatuses, there arises a possibility that plural sets of setting information, contents of which are different from each other, are registered under the same name. In such the case, since the user cannot recognize the differences between the plural sets of setting information only by referring the name of them, there has been a problem that the printing operation has been implemented under the conditions undesired by the user.

SUMMARY

To overcome the abovementioned drawbacks in conventional printing systems, it is one of objects of the present invention to provide a controlling program and a controlling method, each of which is to be employed in a printing system that is provided with an image forming apparatus being capable of assigning a name to setting information so as to register the setting information in association with the name thereof, and which make it possible to eliminate such an inconvenience that occurs at the time when plural sets of setting information, contents of which are different from each other, are registered by assigning the same name.

Accordingly, at least one of the objects of the present invention can be attained by any one of the controlling methods described as follows.

(1) According to a controlling method reflecting an aspect of the present invention, the controlling method to be employed in a printing system that includes a plurality of image forming apparatuses each of which is capable of assigning a name to setting information in regard to the printing operation and also capable of registering the setting information in association with the name thereof; and a specific apparatus to be coupled to the plurality of image forming apparatuses, comprises: acquiring plural sets of setting information, each of which is the setting information registered in each of the plurality of image forming apparatuses in association with the name thereof; determining whether or not at least two of the names assigned to the plural sets of setting information are cognominal; and displaying, on a display section, a message indicating a fact that the same name is assigned to at least two of the plural sets of the setting information, when it is determined that at least two of the names are cognominal.

(2) According to another aspect of the present invention, the controlling method, recited in item 1, further comprises: distinguishably displaying plural sets of setting information of which names are cognominal, when it is determined that at least two of the names are cognominal.

(3) According to still another aspect of the present invention, in the controlling method recited in item 1, the message is indicated in a warning screen displayed on the display section.

(4) According to still another aspect of the present invention, the controlling method, recited in item 1, further comprises: displaying a selecting screen for selecting plural sets of setting information of which names are cognominal, wherein, on the selecting screen, both the names that are cognominal and the plural sets of the setting information that respectively correspond to the names that are cognominal are displayed while correlating the names that are cognominal and the plural sets of setting information respectively.

(5) According to still another aspect of the present invention, in the controlling method recited in item 4, the specific apparatus implements the processing steps included in the controlling method; and the specific apparatus transmits a command signal, in which the set of setting information corresponding to a selected name is described, to at least one of the plurality of image forming apparatuses.

(6) According to still another aspect of the present invention, in the controlling method recited in item 1, the specific apparatus is a computer device that instructs the printing operation to at least one of the plurality of image forming apparatuses.

(7) According to still another aspect of the present invention, in the controlling method recited in item 1, the specific apparatus is a print controller that converts print data, written in a PDL format and received from the computer device, to image data written in a bitmap format, so as to transmit the image data to at least one of the plurality of image forming apparatuses.

(8) According to yet another aspect of the present invention, in the controlling method recited in item 1, the setting information includes any one of information on paper sheets, information on finish processing, information on a tray, and information on a printing mode.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 3(*a*), FIG. 3(*b*) and FIG. 3(*c*) show exemplary layouts of a paper-sheet information registering screen and a paper-sheet detail information setting screen to be displayed on a panel operating section of an image forming apparatus embodied in the present invention;

FIG. 9(*a*), FIG. 9(*b*) show exemplary layouts of print setting screens to be displayed on a display section of a printer controller or a client terminal device, embodied in the present invention;

FIG. 11(*a*), and FIG. 11(*b*) show still other exemplary layouts of print setting screens to be displayed on a display section of a printer controller or a client terminal device, embodied in the present invention.

DETAILED DESCRIPTION OF THE PREFERRED EMBODIMENT

As the preferred embodiment of the present invention, a control program, to be executed in an image forming apparatus being capable of registering the setting information in regard to the printing operation with a name, or to be executed in a printer or a client terminal device coupled to the image forming apparatus concerned, makes a computer serve as: a setting information distinguishing section to acquire plural sets of setting information registered in advance in a plurality of image forming apparatuses and to determine whether or not at least two of the names assigned to the plural sets of setting information are cognominal; and a display controlling section to make the display section distinguishably display specific sets of setting information, names of which are cognominal, when making a display section display the plural sets of setting information, and to make the display section display a warning message indicating the fact that the names are cognominal, when it is determined that at least two of the names are cognominal, and further, to make the display section display both the names that are cognominal and the plural sets of setting information that respectively correspond to the names that are cognominal when making the display section display a selecting screen of the setting information. According to the above, it becomes possible for the user to select the desired setting information without causing any error, and accordingly, it becomes possible to eliminate such the inconvenience that the printing operation has been implemented under the conditions unintended by the user.

Embodiment

Figure 1:
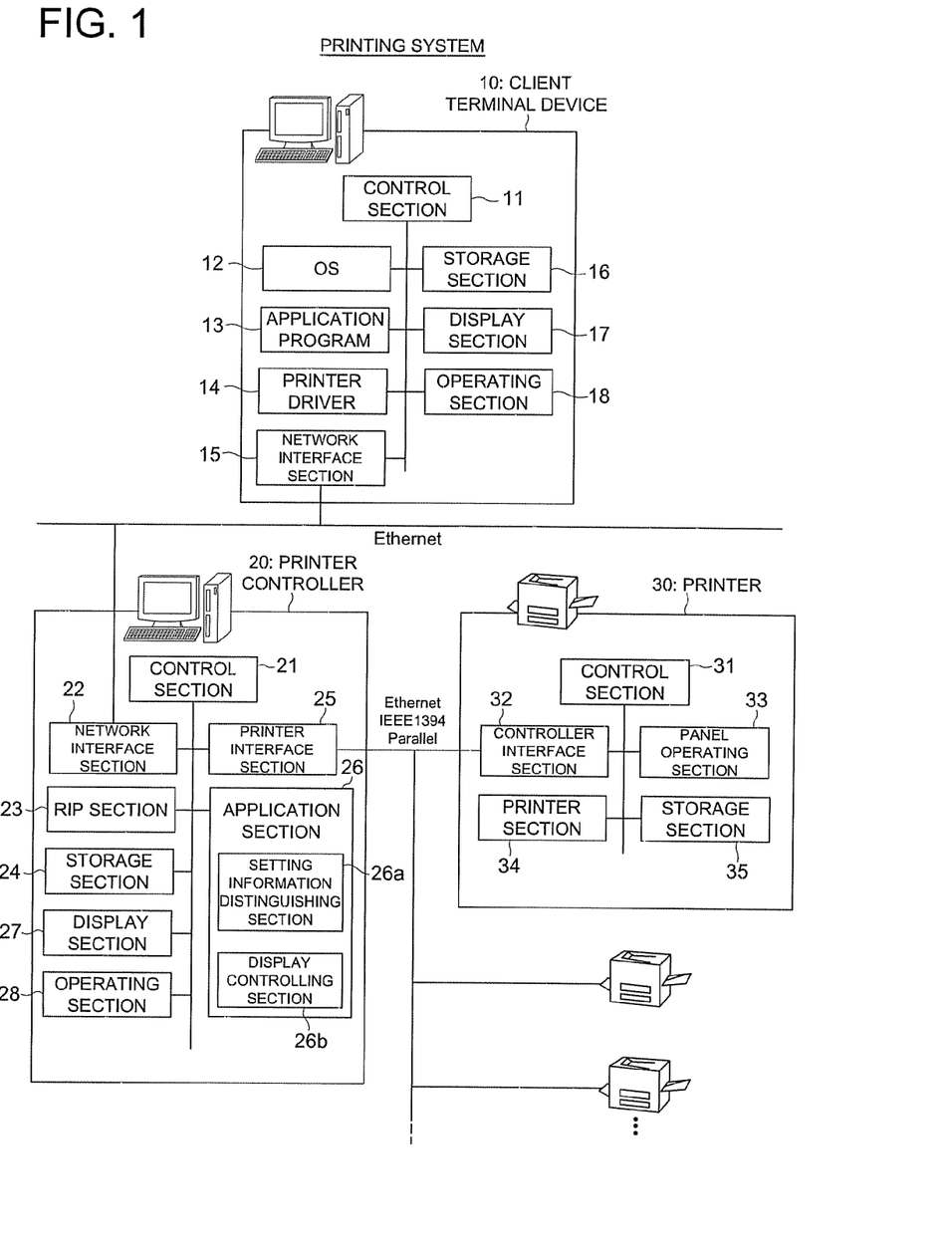
FIG. 1 shows a schematic diagram of a configuration of a printing system embodied in the present invention.
Figure 2:
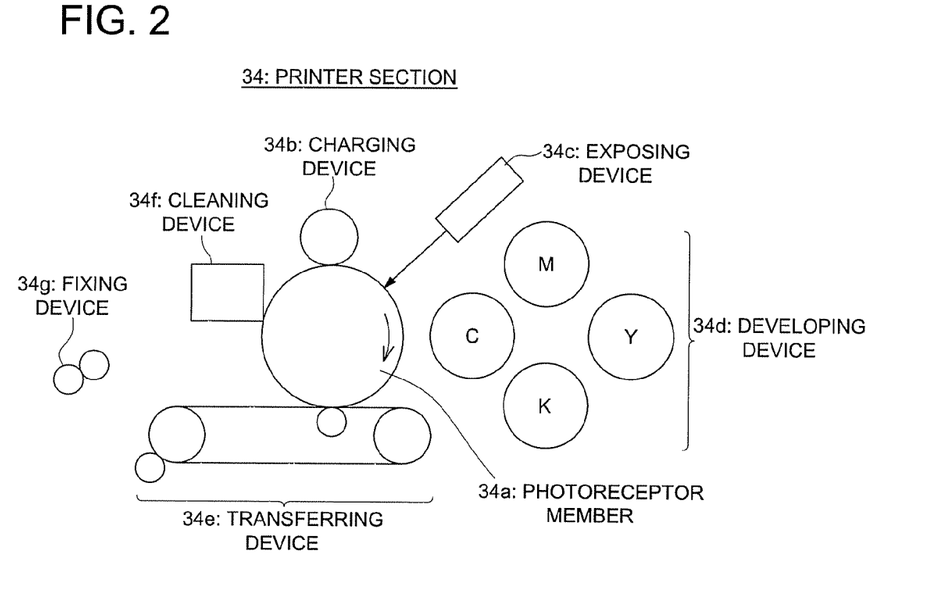
FIG. 2 shows a schematic diagram indicating a configuration of a printing section equipped in an image forming apparatus embodied in the present invention.
Figure 4:
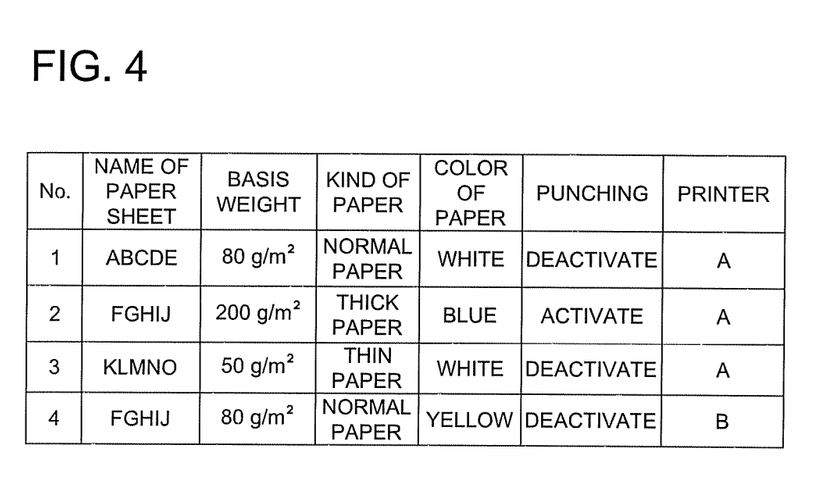
FIG. 4 shows an exemplary layout of paper sheet information to be recorded into a storage section of a printer controller or a client terminal device, embodied in the present invention.
Figure 5:
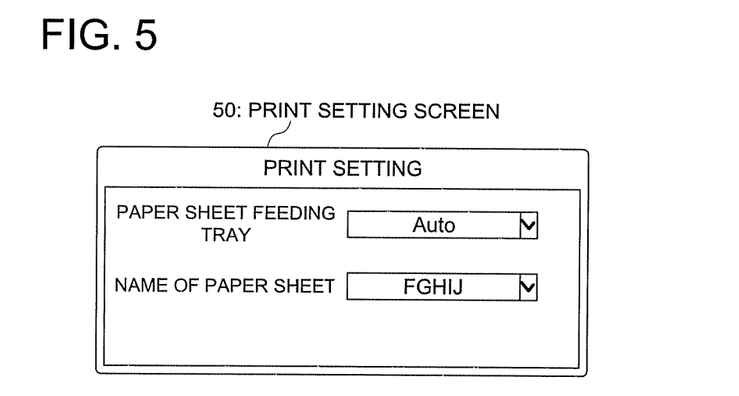
FIG. 5 shows an exemplary layout of a print setting screen to be displayed on a display section of a printer controller or a client terminal device, embodied in the present invention.
Figure 6:
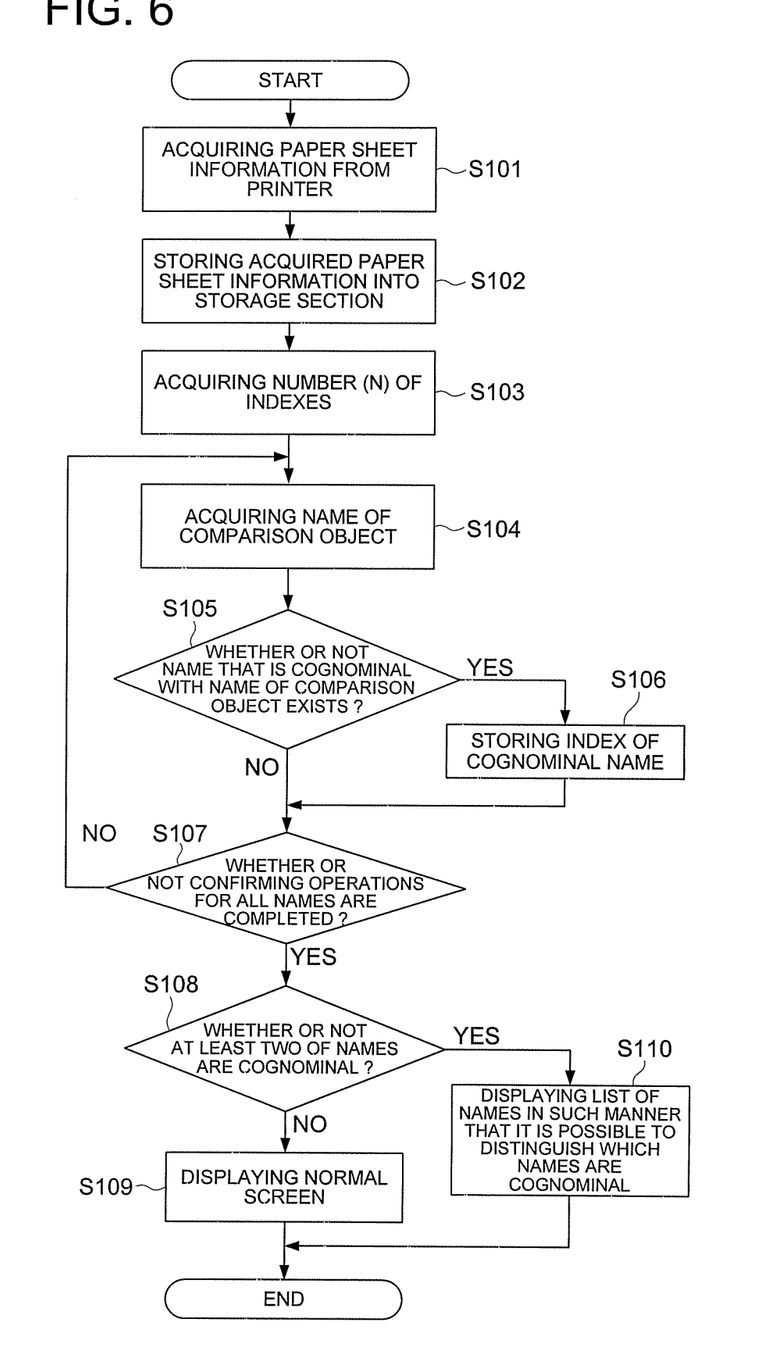
FIG. 6 shows a flowchart indicating a procedure for registering the paper sheet information, embodied in the present invention.
Figure 7:
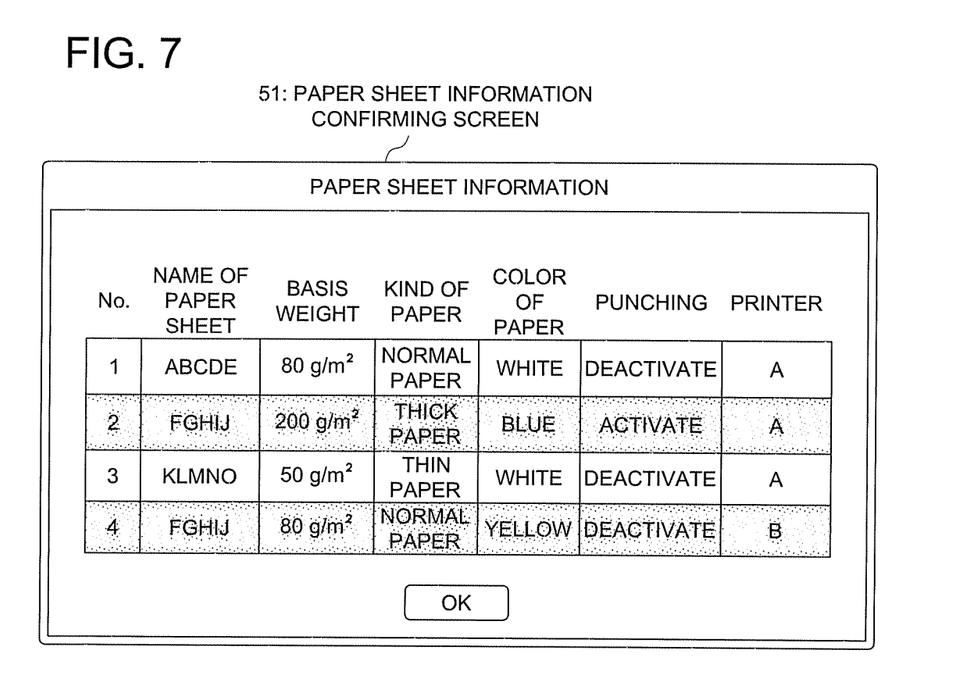
FIG. 7 shows an exemplary layout of a setting information confirming screen to be displayed on a display section of a printer controller or a client terminal device, embodied in the present invention.
Figure 8:
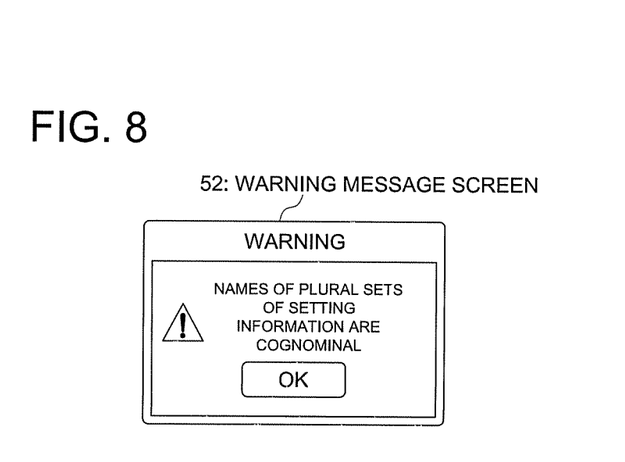
FIG. 8 shows an exemplary layout of a warning screen to be displayed on a display section of a printer controller or a client terminal device, embodied in the present invention.
Figure 9:
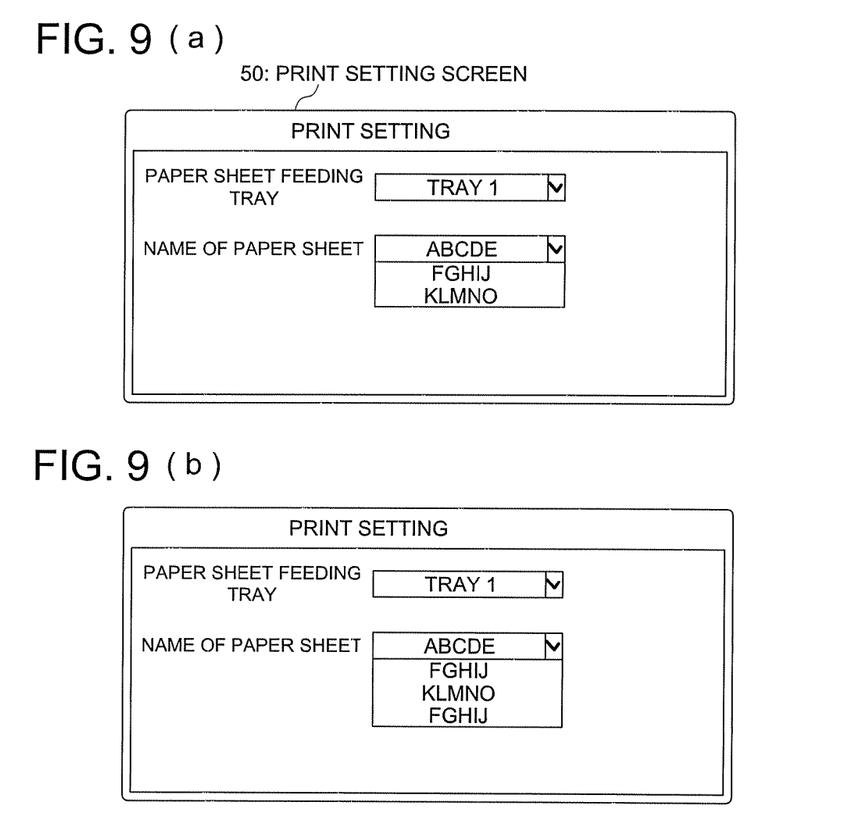
Figure 11:
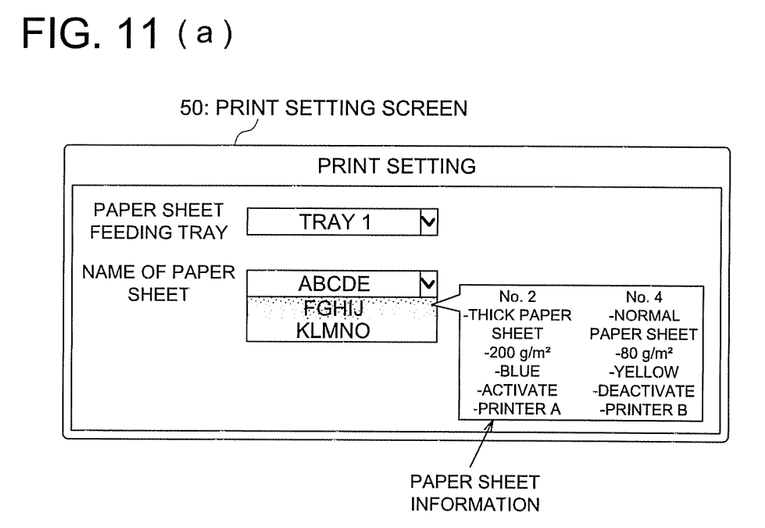
Figure 12:
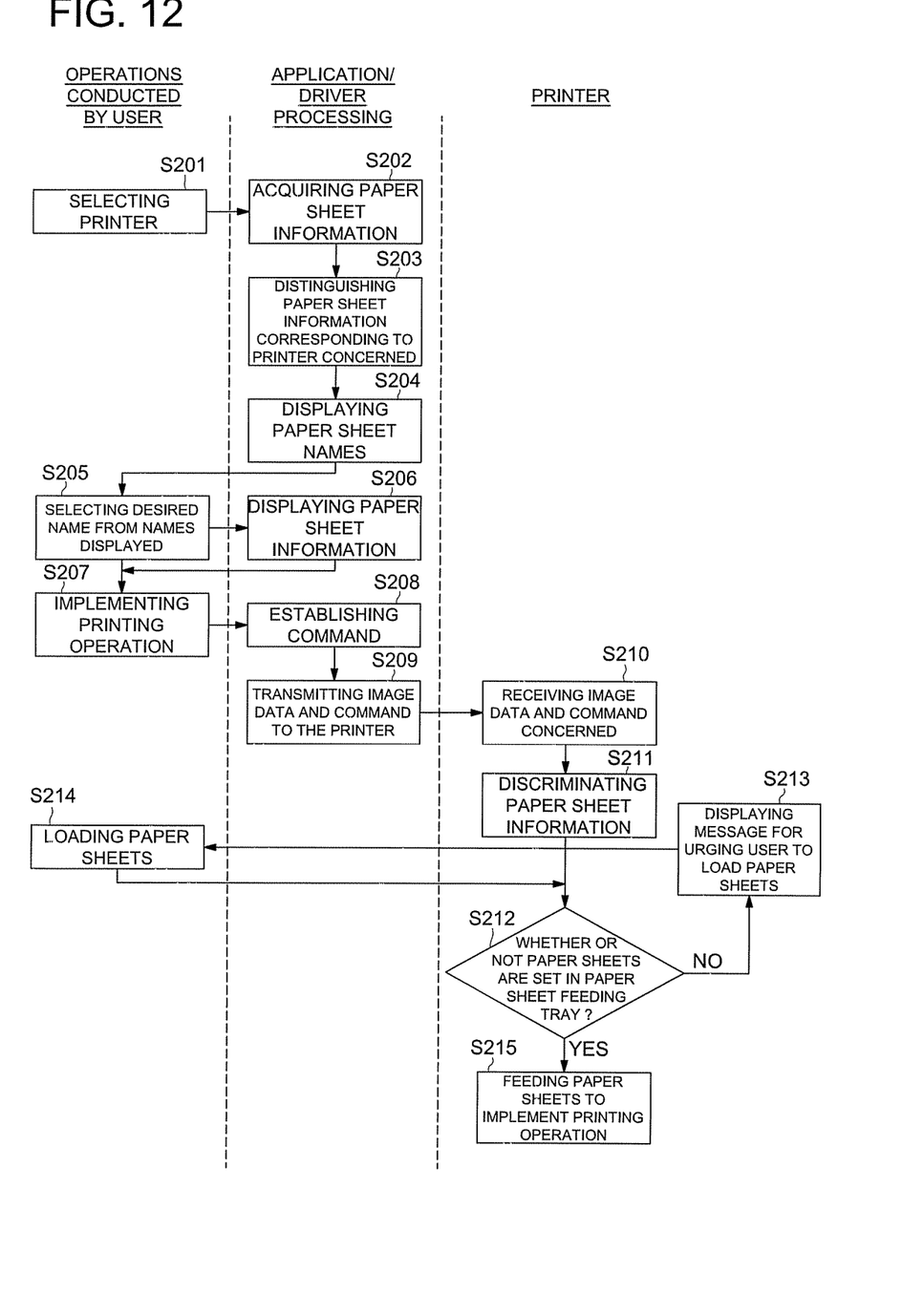
FIG. 12 shows a flowchart indicating a procedure for implementing a printing operation in a printing system embodied in the present invention.

In order to describe the preferred embodiment of the present invention in detail, referring to FIG. 1 through FIG. 12, a controlling program and a controlling method, embodied in the present invention, will be detailed in the following. FIG. 1 shows a schematic diagram of a configuration of the printing system embodied in the present invention, FIG. 2 shows a schematic diagram indicating a configuration of a printing section equipped in the image forming apparatus. Further, FIGS. 3(*a*), 3(*b*) and 3(*c*) show exemplary layouts of a paper-sheet information registering screen and a paper-sheet detail information setting screen, FIG. 4 shows an exemplary layout of paper sheet information, FIG. 5 shows an exemplary layout of a print setting screen, and FIG. 6 shows a flowchart indicating a procedure for registering the paper sheet information. Still further, FIG. 7 shows an exemplary layout of a setting information confirming screen, and FIG. 8 shows an exemplary layout of a warning screen. Yet further, FIGS. 9(*a*), 9(*b*), 10, 11(*a*), and 11(*b*) show exemplary layouts of the print setting screens for various phases, and FIG. 12 shows a flowchart indicating a procedure for implementing the printing operation by employing the printing system embodied in the present invention.

As shown in FIG. 1, in the printing system embodied in the present invention, a client terminal device 10, a printer controller 20 and a printer 30, each of which is connectable to a communication network, are installed on the Intranet. In this connection, although Ethernet, etc. can be employed as the communication network standard for this purpose, the IEEE1394, the Parallel, etc., other than Ethernet, can be also employed as the data transferring standard for transferring data from the printer controller 20 to the printer 30. Further, although the printer controller 20 is installed separately from the printer 30 in the configuration shown in FIG. 1, it is also applicable that the printer controller 20 is included in the printer 30.

The client terminal device 10 is a kind of computer apparatus, such as a personal computer, etc., which is provided with a control section 11, an OS (Operating System) 12, an application program 13, a printer driver 14, a network interface section 15, a storage section 16, a display section 17, an operating section 18, etc.

The control section 11 is constituted by a CPU (Central Processing Unit), memories, such as a ROM (Read Only Memory) and a RAM (Random Access Memory), etc., so as to control overall operations of the client terminal device 10. The Windows (Registered Trademark) or the Macintosh (Registered Trademark), etc. is employed as the OS 12, which makes the application program 13 executable in the client terminal device 10. The application program 13 is a kind of software for creating a document, etc. The printer driver 14 converts the document data, created by employing the application program 13, to print data written in a PDL (Page Description Language), such as PCL (Printer Control Language), PostScript (Registered Trademark), etc., being readable by the printer controller 20. Further, the network interface section 15 is constituted by the NIC (Network Interface Card), etc., so as to couple the client terminal device 10 to the communication network. The storage section 16 is constituted by various kinds of storage devices, an HDD (Hard Disk Drive), etc., so as to store the setting information registered in the printer 30, etc., therein. Still further, the display section 17 is constituted by an LCD (Liquid Crystal Display), etc., so as to display various kinds of screens, thereon. Yet further, the operating section 18 is constituted by a mouse, a keyboard, etc., so as to make various kinds of operations to be conducted by the user, such as an operation for selecting the setting information, etc., possible.

The printer controller 20 is provided with a control section 21, a network interface section 22, a RIP section 23, a storage section 24, a printer interface section 25, an application section 26, and further provided with a display section 27, an operating section 28, etc., as needed, so as to control the printer 30 according to instructions and commands issued by the client terminal device 10.

The control section 21 is constituted by a CPU, memories, such as a ROM and a RAM, etc., so as to control overall operations of the printer controller 20. The network interface section 22 is constituted by the NIC, etc., so as to couple the printer controller 20 to the communication network. The RIP section 23 parses the data written in the PDL (hereinafter, referred to as print data), so as to develop the print data into image data in a bitmap format. Further, the storage section 24 is constituted by a memory, an HDD, etc., so as to store the print data, the image data, the setting information registered in the printer 30, etc., therein. The printer interface section 25 sends instructions for transmitting the image data and for designating the outputting method to the printer 30. Still further, the application section 26 edits a job ticket for conducting the editing operation of the image data created by the RIP section 23 and that for conducting a finish processing, and conducts data controlling operations for printing. Yet further, the display section 27 is constituted by an LCD, etc., so as to display various kinds of screens, thereon, while the operating section 28 is constituted by a mouse, a keyboard, etc., so as to make various kinds of operations to be conducted by the user, such as an operation for selecting the setting information, etc., possible.

Specifically, the application section 26 serves as a setting information distinguishing section 26*a* to acquire plural sets of setting information registered in a plurality of printers 30 coupled to the network and to determine whether or not at least two of the names assigned to the plural sets of setting information are cognominal, and also serves as a display controlling section 26*b* to make the display section 27 distinguishably display specific sets of setting information, names of which are cognominal, when making a display section 27 display the plural sets of setting information, and to make the display section 27 display a warning message indicating the fact that the same name is assigned to at least two of the plural sets of the setting information, when it is determined that at least two of the names are cognominal.

Further, the printer 30 can control a plurality of printers 30 to conduct a printing operation. Namely, for instance, when an error of paper jamming has occurred during a printing operation currently conducted in printer A, the control section 21 can conducts such a controlling operation as an error recovery processing for transmitting the residual image data to printer B, etc., and it is also possible for the control section 21 to control a dispersion processing for shortening the print completion time by dispersing the number of prints into printer A and printer B.

The printer 30 is a kind of image forming apparatus to implement the printing operation based on the instructions issued by the printer controller 20, and is constituted by a control section 31, a controller interface section 32, a panel operating section 33, a printer section 34, a storage section 35, etc.

The control section 31 is constituted by a CPU, memories, such as a ROM and a RAM, etc., so as to control overall operations of the printer 30. The controller interface section 32 is constituted by the NIC, etc., so as to make it possible to communicate with the printer controller 20. The panel operating section 33 is provided with a pressure sensitive operating section (a touch panel) covering over its display screen, in which transparent electrodes are aligned in a lattice pattern, so as to make it possible to operate the printer 30, to register the setting information, etc. Further, the printer section 34 implements the printing operation according to the printing instructions. As shown in FIG. 2, the printer section 34 is provided with a photoreceptor member 34a, a charging device 34b, an exposing device 34c, a developing device 34d, a transferring device 34e, a cleaning device 34f, a fixing device 34g, etc. Still further, the storage section 35 is constituted by a memory, an HDD, etc., so as to store the setting information to be registered in the printer 30, etc., therein.

In this connection, although the setting information distinguishing section 26a and the display controlling section 26b are provided in the application section 26 of the printer controller 20 as software in the present embodiment, it is also applicable that both the setting information distinguishing section 26a and the display controlling section 26b are configured as hardware. Further, the client terminal device 10 is capable of acquiring the setting information by employing the HTTP (Hyper-Text Transfer Protocol) or the SNMP (Simple Network Management Protocol), etc., it is applicable that the setting information distinguishing section and the display controlling section are operated on either the printer driver 14 or the printer 30.

The operations of the printing system having the above-mentioned configuration will be detailed in the following. At first, a procedure for registering the setting information into the printer 30 will be detailed. In this connection, although there will be detailed as the present embodiment such the case that information with respect to paper sheets (hereinafter, referred to as paper sheet information), such as a basis weight of paper sheet, a kind of paper sheet, a color of paper sheet, punching or non-punching, etc., is registered in the printer 30, it is also applicable that other information, for instance, information with respect to the finish processing, tray information such as a mail bin, etc., information with respect to a printing mode (such as one side printing or duplex printing, color or monochrome, presence or absence of a transparency pattern such as a watermark, etc.), or combination of them, can be established as the setting information, as far as the other information is related to the printing operation.

Figure 3A:
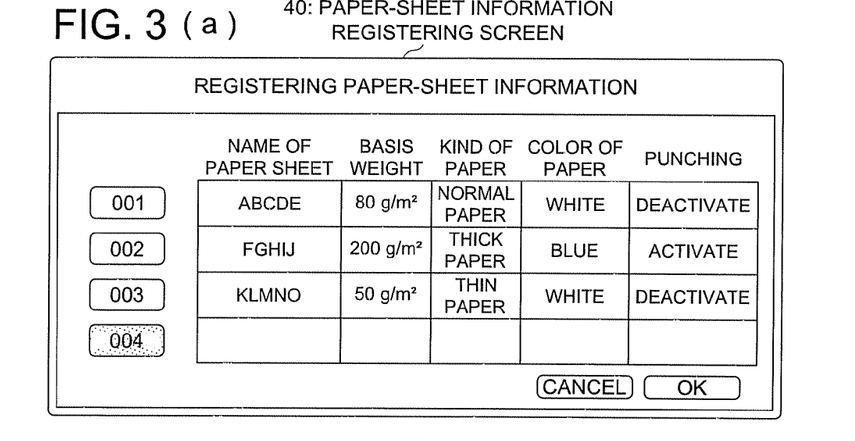
Figure 3B:
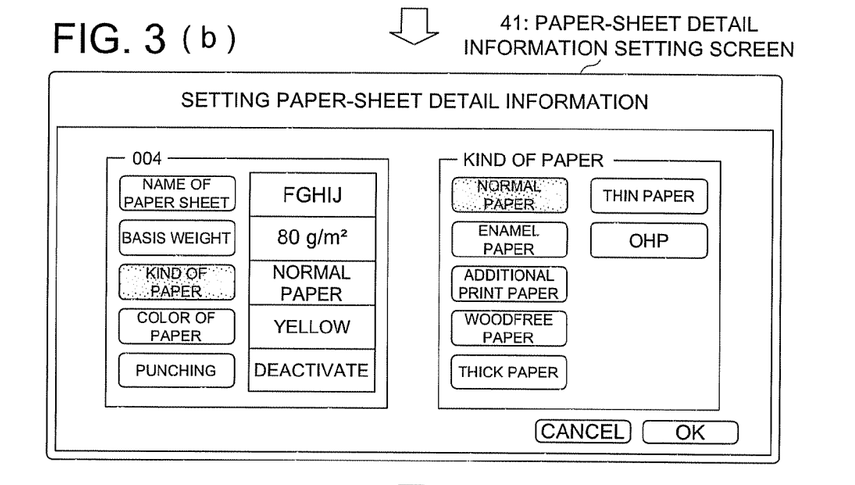
Figure 3C:
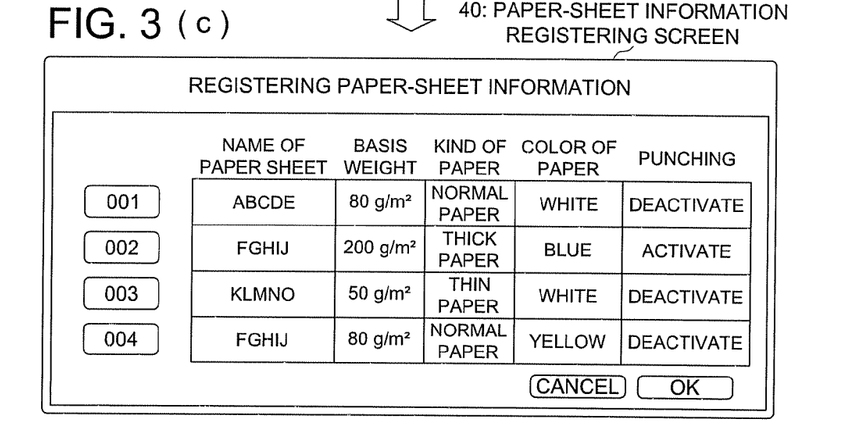

When the user wishes to register new paper sheet information, the user operates the panel operating section 33, so that a paper-sheet information registering screen 40, for instance as shown in FIG. 3(a), is displayed on the display screen. In the paper-sheet information registering screen 40, the paper sheet information, such as a name of paper sheet, a basis weight, a kind of paper sheet, a paper color, presence or absence of punching, etc., are registered while correlating them to each of numbers. Depressing a new number button (namely, a non-registered number, herein, "004"), a paper-sheet detail information setting screen 41 is displayed as shown in FIG. 3(b). Then, depressing the OK button after inputting the name of paper sheet and attributes provided for the concerned paper sheet by depressing corresponding buttons displayed on the paper-sheet detail information setting screen 41, the paper-sheet information registering screen 40 is displayed again, and the paper sheet information, corresponding to member "004", are newly registered in the paper-sheet information registering screen 40 as shown in FIG. 3(c).

The paper sheet information registered in the above is stored in the storage section 35, for instance, as the MIB (Management Information Base: defined as information to be disclosed for public by a network apparatus currently controlled in accordance with the SNMP, so as to notify the external devices of its own status), etc., and is transmitted to the application section 26 of the printer controller 20, the printer driver 14 of the client terminal device 10, etc., through the communication network, so as to notify them of contents of the newly-registered paper sheet information. Receiving the paper sheet information, the printer controller 20 (or the client terminal device 10) stores the received paper sheet information into the storage section 24 (or the storage section 16) in form of the Table as shown in FIG. 4. It is applicable that the Table only includes the paper sheet information, or information, for distinguishing from which printer 30 the paper sheet information concerned is acquired ("Printer" column shown in FIG. 4), is attached to the Table.

Successively, when the user wishes to designate the paper sheet to be employed for printing, a print setting screen 50 as shown in FIG. 5 is displayed on the display section 17, so that a list of paper sheet feeding trays or a list of paper sheet names, registered in advance, are displayed in the paper-sheet feeding tray column or the paper sheet name column. Then, the user selects either "Auto" mode for automatically selecting a paper sheet feeding tray, which agrees with the desired paper sheet feeding tray or the name of desired paper sheet from the list of the paper sheet feeding trays, or the name of desired paper sheet from the list of paper sheet names, and instructs the printing operation. Then, the printer 30 implements the printing operation according to the above instructions inputted by the user.

For instance, when the user designates a specific paper sheet feeding tray, the printer 30 conducts the printing operation by feeding a paper sheet accommodated in the specific paper sheet feeding tray designated by the user. While, when the user designates a name of specific paper sheet, the printer 30 conducts the printing operation by feeding the specific paper sheet picked up from the paper sheet feeding tray in which the specific paper sheets designated by the user are accommodated. If the specific paper sheets are not accommodated in the paper sheet feeding tray concerned, the printer 30 makes the panel operating section 33 display an attention message for urging the user to accommodate paper sheets, corresponding to the name of specific paper sheet designated by the user, into the paper sheet feeding tray concerned.

At this occasion, when the names of plural sets of paper sheet information, registered in the Table, are not same each other (in other words, they are not cognominal), there is no possibility that the printing operation is implemented under the conditions unintended by the user. As shown in FIG. 4, however, when the same name (herein, "FGHIJ") is registered for two sets of paper sheet information, contents of which are different from each other, it is impossible to determine which set of paper sheet information should be selected, only by referring to the paper sheet names indicated in the list of the print setting screen 50. Accordingly, for instance, there arises such an inconvenience that, although the user intends to conduct the printing operation according to the paper sheet information written in the second line (No. 2) in the Table shown in FIG. 4, the actual printing operation has implemented according to the paper sheet information written in the fourth line (No. 4).

Accordingly, to prevent occurrence of such the inconvenience as mentioned in the above, the present embodiment conducts controlling operations for: determining whether or not any two of the names of paper sheets, registered in the printers 30, are cognominal; distinguishably displaying specific sets of setting information, names of which are cognominal; displaying a warning message screen; etc. Now, referring to the flowchart shown in FIG. 6, the concrete controlling method will be detailed in the following. In this connection, although it is applicable that either the printer controller 20 or the client terminal device 10 conducts the controlling operations shown in FIG. 6, hereinafter, the following description is made with respect to the case that the printer controller 20 conducts the controlling operations.

Initially, the control section 21 of the printer controller 20 acquires the paper sheet information from the printer 30 through the printer interface section 25 (Step S101), and then, stores the acquired paper sheet information into the storage section 24 (Step S102).

Successively, the setting information distinguishing section 26a of the application section 26 acquires a number of indexes (number of paper sheet information) (Step S103), and acquires a name of comparison object (Step S104). Still successively, the setting information distinguishing section 26a determines whether or not a name that is cognominal with the name of comparison object exists (Step S105). When determining that a cognominal name exists, the setting information distinguishing section 26a stores an index of the overlapping paper sheet of the cognominal name (Step S106), and determines whether or not the confirming operations for all of the names are completed (Step S107), and then, when determining that the confirming operations for all of the names have not been completed, returns to Step S104 so as to repeat the same processing as mentioned in the above. Still successively, after the comparing operations with respect to all of the names are completed, the setting information distinguishing section 26a confirms the stored indexes, so as to determine whether or not at least two of the names are cognominal (Step S108).

Yet successively, when determining that any two of the names are not cognominal, the list of the names are displayed in the paper sheet name column of the print setting screen 50 currently displayed on the display section 27 in accordance with the normal displaying method (Step S109), while, when determining that at least two of the names are cognominal, the display controlling section 26b displays the list of the names in such a manner that it is possible to distinguish which names are cognominal (Step S110).

For instance, when displaying a paper sheet information confirming screen 51 shown in FIG. 7 on the display section 27, the display controlling section 26b colors the overlapping specific lines in on which the names that are cognominal are indicated, or makes the specific lines flashing, so as to make them distinguishable. In addition, as shown in FIG. 8, in order to clearly notify the user of the fact that the same name is assigned to at least two of the plural sets of the setting information, the display controlling section 26b controls the display section 27 to display a warning message screen 52 indicating that the names of plural sets of setting information are cognominal. Then, the user recognizes the fact that at least two of the names are cognominal by viewing the paper sheet information confirming screen 51 and/or the warning message screen 52, and operates the printer 30 to conduct the reregistering operation of the paper sheet information concerned, as needed.

In this connection, although the foregoing descriptions have been made with respect to such the case in which the same name is assigned to at least two of the plural sets of the setting information, even if different names are registered for plural sets of paper sheet information, contents of which are the same as each other, it is also possible to display the same kind of paper sheet information confirming screen 51 and/or warning message screen 52. In that case, it is possible to display the message of "Paper sheet of this setting contents is already registered with a different name", etc., on the warning message screen 52.

Although described in the foregoing are the controlling operations to be conducted at the time when the printer controller 20 (or the client terminal device 10) confirms the paper sheet information, the similar controlling operations are applicable for such the case that the printer controller 20 (or the client terminal device 10) selects the paper sheet information.

For instance, when instructing the printer A to conduct the printing operation, as shown in FIG. 9(a), the paper sheet information registered in the printer A is displayed on the print setting screen 50. At this time, if both the printer A and the printer B are coupled to each other through the network, and the names assigned to at least two of the plural sets of the setting information are cognominal, as shown in FIG. 9(b), the cognominal names are displayed as they are.

Figure 10:
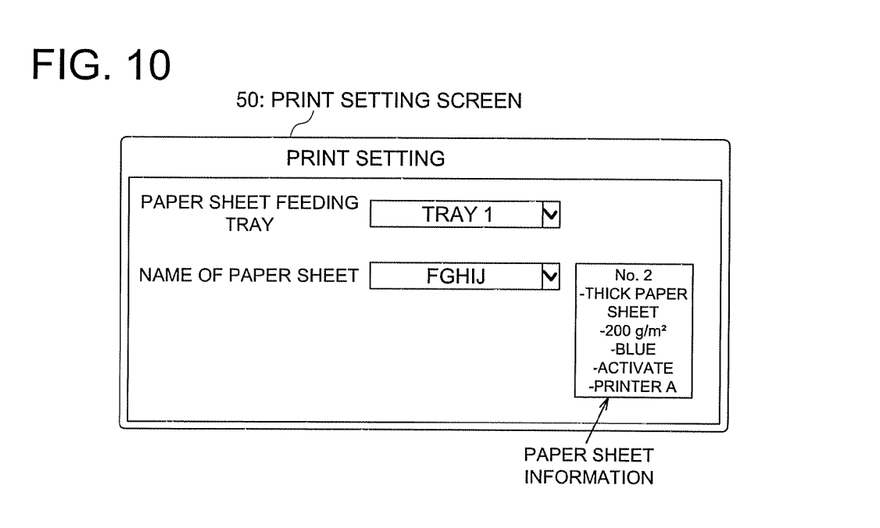
FIG. 10 shows another exemplary layout of a print setting screen to be displayed on a display section of a printer controller or a client terminal device, embodied in the present invention.

To overcome the abovementioned inconvenience, according to the present embodiment, when making the display section 27 display the print setting screen 50, the display controlling section 26b controls the display section 27 to display the paper sheet information registered in correlation with the name selected by the user from the paper sheet name column, as shown in FIG. 10. Accordingly, it becomes possible to prevent the user form erroneously designating the paper sheet unintended by the user.

Alternatively, as shown in FIG. 11(a), it is also applicable that, when displaying the list of the names in the paper sheet name column, the names that are cognominal are displayed together as the single name, and at the same time, plural sets of the paper sheet information, which are registered corresponding to the names that are cognominal, are also displayed in a correlating mode, or, as shown in FIG. 11(b), the total list of names is displayed in the paper sheet name column, and at the same time, plural sets of the paper sheet information, each of which is registered corresponding to each of the names that are cognominal, are also displayed while correlating each of them with each of the names that are cognominal.

Referring to the flowchart shown in FIG. 12, the printing procedure to be employed in the printing system, embodied in the present invention, will be detailed in the following.

Initially, the user selects the printer 30 to implement the printing operation by activating the application section 26 of the printer controller 20 (or the printer driver 14 of the client terminal device 10) (Step S201).

Successively, the application section 26 (or the printer driver 14) acquires the paper sheet information stored in advance in the storage section 24 (or the storage section 16) (Step S202), and distinguishes the paper sheet information corresponding to the printer 30 selected by the user (Step S203), and then, makes the display section 27 (or the display section 17) display the print setting screen 50 (Step S204).

Still successively, when the user selects a desired name from the names displayed (Step S205), the application section 26 (or the printer driver 14) determines whether or not the selected name is cognominal with any one of other names (Step S206). When determining that the selected name is cognominal with any one of other names, the setting information distinguishing section 26a specifies the paper sheet information corresponding to the name concerned, so as to make the display section 27 display the name that is cognominal with any one of other names and the paper sheet information, while correlating them with each other, as shown in FIG. 10 (Step S206). In this connection, it is also applicable that, when displaying the list of the names in the paper sheet name column, name(s) that is/are cognominal with any one of other names and the paper sheet information, is/are displayed while correlating (each of) the name(s) with (each of) paper sheet information set(s), as shown in FIG. 11(*a*) and FIG. 11(*b*).

Still successively, when the user instructs the implementation of printing operation while designating the paper sheet to be used for the printing operation (Step S207), the application section 26 (or the printer driver 14) establishes a command corresponding to the instruction (Step S208), and transmits the image data (or print data) and the command to the printer 30 (Step S209). On that occasion, if plural sets of the paper sheet information, having the same name, are registered, since it is impossible to specify each of the plural sets of the paper sheet information only by the name, the established paper sheet information is described in the command. An example of such the command is indicted as follow.

---
SET Command
    Paper Name = ABCDE
    Paper Weight = 80
    Paper Type = NORMAL
    Paper Color = WHITE
    Paper Hole = OFF
---

Still successively, the printer 30 receives the image data and the command (Step S210), and then, the control section 31 parses the command to discriminate the paper sheet information (Step S211) and confirms whether or not the paper sheets designated by the paper sheet information are set in the paper sheet feeding tray (Step S212).

Yet successively, when confirming that the paper sheets are not set in the paper sheet feeding tray (Step S212; No), the control section 31 controls the panel operating section 33 to display a message, for urging the user to load the paper sheets into the paper sheet feeding tray, on the screen (Step S213). When the user has loaded the paper sheets (Step S214), the control section 31 confirms again whether or not the paper sheets designated by the paper sheet information are set in the paper sheet feeding tray (Step S212). When confirming that the paper sheets are set in the paper sheet feeding tray (Step S212; Yes), the control section 31 feeds the paper sheets from the paper sheet feeding tray to implement the printing operation (Step S215).

As described in the foregoing, when the application section 26 of the printer controller 20 (or the printer driver 14 of the client terminal device 10) acquires the setting information, such as the paper sheet information, etc., from the printer 30, the setting information distinguishing section 26*a* determines whether or not at least two of the names assigned to the plural sets of setting information are cognominal, while, when making the display section 27 (or the display section 17) display the paper sheet information confirming screen 51, the display controlling section 26*b* makes the display section 27 (or the display section 17) distinguishably display the specific sets of setting information, names of which are cognominal. Further, when determining it is determined that at least two of the names assigned to the plural sets of setting information are cognominal, the display controlling section 26*b* makes the display section 27 (or the display section 17) display the warning message indicating the fact that the same name is assigned to at least two of the plural sets of the setting information. Still further, when making the display section 27 (or the display section 17) display the print setting screen 50, the display controlling section 26*b* controls the display section 27 (or the display section 17) to display both the names that are cognominal and the plural sets of the setting information that respectively correspond to the names that are cognominal, while correlating the names that are cognominal and the plural sets of setting information respectively. According to the above, it becomes possible to prevent the printing operation from occurring inconvenience that the printing operation has been implemented under the conditions unintended by the user.

In this connection, although the example, in which the application section 26 of the printer controller 20 or the printer driver 14 of the client terminal device 10 serves as both the setting information distinguishing section 26*a* and the display controlling section 26*b*, has been indicated as the present embodiment, the scope of the present invention is not limited to the embodiment described in the foregoing. It is also applicable that the application section 26 is configured in the printer 30, and further, it is possible to configure the application section 26 in the format of the web browser, so as to operate it in an arbitral apparatus coupled to the communication network.

The present invention is applicable for an arbitral controlling program and a controlling method to control information to be registered in an image forming apparatus.

According to the controlling program and the controlling method embodied in the present invention, in a printing system that is provided with the image forming apparatuses, which is capable of assigning a name to the setting information and also capable of registering the setting information and the name therein, it becomes possible to prevent the printing operation from occurring inconvenience that the printing operation has been implemented under the conditions unintended by the user.

This is because, even if plural sets of setting information, contents of which are different from each other, are registered by assigning the same name, the printer driver of the client terminal device, the application section of the printer controller or the application program of the printer conducts such the controlling operations of: determining whether or not at least two of the names assigned to the plural sets of setting information are cognominal; distinguishably displaying specific sets of setting information, names of which are cognominal, when making a display section display the plural sets of setting information; displaying a warning message indicating the fact that the same name is assigned to at least two of the plural sets of the setting information, when it is determined that at least two of the names are cognominal; and making the display section display both the names that are cognominal and the plural sets of the setting information that respectively correspond to the names that are cognominal while correlating the names that are cognominal and the plural sets of setting information respectively, when making the display section display the selecting screen of the setting information.

While the preferred embodiments of the present invention have been described using specific term, such description is for illustrative purpose only, and it is to be understood that changes and variations may be made without departing from the spirit and scope of the appended claims.

What is claimed is:

1. A non-transitory computer readable storage medium storing a computer executable program executed by either of one of a plurality of image forming apparatuses or a specific apparatus to be coupled to the plurality of image forming apparatuses, for a printing system that includes the plurality of image forming apparatuses each of which is capable of assigning a name to setting information in regard to the printing operation and also capable of registering the setting information in association with the name thereof, the program being executable by a computer to cause the computer to perform a process comprising:

acquiring plural sets of setting information, each of which is the setting information registered in each of the plurality of image forming apparatuses in association with the name thereof;

acquiring a plurality of names registered in said plurality of image forming apparatuses in association with said plural sets of setting information, wherein said plurality of names are registered in such a manner that a user can assign a respective one of said plural sets of setting information to a print job by selecting a respective one of said plurality of names assigned to the respective one of said plural sets of setting information;

determining whether or not a same name of said acquired plurality of names is assigned to at least two of the plural sets of setting information, contents of the at least two of the plural sets of setting information being different from one another; and     displaying, on a display section, a message indicating a fact that the same name is assigned to at least two of the plural sets of setting information, the contents of which being different from one another, when it is determined that the same name is assigned to said at least two sets of setting information.

2. The non-transitory computer readable storage medium of claim 1, wherein the process further comprises:

when it is determined that the same name is assigned to said at least two sets of setting information, distinguishably displaying the at least two sets of setting information.

3. The non-transitory computer readable storage medium of claim 1, wherein the message is indicated in a warning screen displayed on the display section.

4. The non-transitory computer readable storage medium of claim 1, wherein the process further comprises:

displaying a selecting screen for selecting said at least two sets of setting information,         wherein, on the selecting screen, the same name assigned to said at least two sets of setting information and the at least two sets of setting information that correspond to the same name are displayed.

5. The non-transitory computer readable storage medium of claim 1, wherein the setting information includes any one of information on paper sheets, information on finish processing, information on a tray, and information on a printing mode.

6. A controlling method to be employed in a printing system that includes a plurality of image forming apparatuses each of which is capable of assigning a name to setting information in regard to the printing operation and also capable of registering the setting information in association with the name thereof; and a specific apparatus to be coupled to the plurality of image forming apparatuses, the controlling method comprising:

acquiring plural sets of setting information, each of which is the setting information registered in each of the plurality of image forming apparatuses in association with the name thereof;

acquiring a plurality of names registered in said plurality of image forming apparatuses in association with said plural sets of setting information, wherein said plurality of names are registered in such a manner that a user can assign a respective one of said plural sets of setting information to a print job by selecting a respective one of said plurality of names assigned to the respective one of said plural sets of setting information;

determining whether or not a same name of said acquired plurality of names is assigned to at least two of the plural sets of setting information, contents of the at least two of the plural sets of setting information being different from one another; and     displaying, on a display section, a message indicating a fact that the same name is assigned to at least two of the plural sets of setting information, the contents of which being different from one another, when it is determined that the same name is assigned to said at least two sets of setting information.

7. The controlling method of claim 6, further comprising:

distinguishably displaying the at least two sets of setting information, when it is determined that the same name is assigned to said at least two sets of setting information.

8. The controlling method of claim 6, wherein the message is indicated in a warning screen displayed on the display section.

9. The controlling method of claim 6, further comprising:

displaying a selecting screen for selecting the at least two sets of setting information,     wherein, on the selecting screen, the same name assigned to said at least two sets of setting information and the at least two sets of setting information that correspond to the same name are displayed.

10. The controlling method of claim 9, wherein the specific apparatus implements the processing steps included in the controlling method; and     wherein the specific apparatus transmits a command signal, in which the set of setting information corresponding to a selected name is described, to at least one of the plurality of image forming apparatuses.

11. The controlling method of claim 6, wherein the specific apparatus is a computer device that instructs the printing operation to at least one of the plurality of image forming apparatuses.

12. The controlling method of claim 6, wherein the specific apparatus is a print controller that converts print data, written in a PDL format and received from the computer device, to image data written in a bitmap format, so as to transmit the image data to at least one of the plurality of image forming apparatuses.

13. The controlling method of claim 6, wherein the setting information includes any one of information on paper sheets, information on finish processing, information on a tray, and information on a printing mode.

* * * * *